US009942831B2

(12) United States Patent
Laraqui et al.

(10) Patent No.: US 9,942,831 B2
(45) Date of Patent: Apr. 10, 2018

(54) NODE AND METHOD FOR HANDLING INFORMATION CENTRIC NETWORKING BASED COMMUNICATIONS (71) Applicant: TELEFONAKTIEBOLAGET L M ERICSSON (PUBL), Stockholm (SE)

(72) Inventors: Kim Laraqui, Solna (SE); Sándor Albrecht, Danderyd (SE); Suresh Krishnan, Johns Creek, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 11 days.

(21) Appl. No.: 14/431,898

(22) PCT Filed: Feb. 9, 2015

(86) PCT No.: PCT/SE2015/050148
§ 371 (c)(1),
(2) Date: Oct. 1, 2015

(87) PCT Pub. No.: WO2016/053159
PCT Pub. Date: Apr. 7, 2016

(65) Prior Publication Data
US 2016/0100350 A1    Apr. 7, 2016

Related U.S. Application Data (60) Provisional application No. 62/058,120, filed on Oct. 1, 2014.

(51) Int. Cl.
*H04W 48/16*    (2009.01)
*H04M 7/00*    (2006.01)
(Continued)

(52) U.S. Cl.
CPC ......... *H04W 48/16* (2013.01); *H04L 67/2842* (2013.01); *H04M 7/0012* (2013.01); *H04W 4/005* (2013.01); *H04W 60/00* (2013.01); *H04L 61/30* (2013.01); *H04L 61/6009* (2013.01); *H04L 67/28* (2013.01); *H04L 67/288* (2013.01); *H04L 67/2814* (2013.01); *H04L 67/2866* (2013.01); *H04L 67/327* (2013.01); *H04W 88/08* (2013.01)

(58) Field of Classification Search
None
See application file for complete search history.

(56) References Cited

U.S. PATENT DOCUMENTS

2009/0083279 A1\* 3/2009 Hasek ................. H04L 67/2823
2012/0159176 A1\* 6/2012 Ravindran ............ H04L 63/104
713/176

(Continued)

OTHER PUBLICATIONS

Karimzadeh, M., et al., "Utilizing ICN/CCN for service and VM migration support in virtualized LTE systems," Dept of Computer Science and the Electrical Engineering, University of Twente, Enschede, The Netherlands; Apr. 3, 2014.

(Continued)

*Primary Examiner* — Hicham Foud (57) ABSTRACT

A base station and wireless device, as well as corresponding methods, for Information Centric Networking (ICN) based communications with radio bearers, to provide a means for using ICN bearers in parallel with standard Packet Data Network (PDN) bearers.

24 Claims, 8 Drawing Sheets

(51) Int. Cl.
*H04W 4/00* (2018.01)
*H04W 60/00* (2009.01)
*H04L 29/12* (2006.01)
*H04W 88/08* (2009.01)
*H04L 29/08* (2006.01)

(56) References Cited

U.S. PATENT DOCUMENTS

| | | | | |
|---|---|---|---|---|
| 2012/0254417 A1* | 10/2012 | Luna | H04L 67/2828 | 709/224 |
| 2013/0301559 A1* | 11/2013 | Zakrzewski | H04W 28/0215 | 370/329 |
| 2013/0322274 A1* | 12/2013 | Zakrzewski | H04W 28/021 | 370/252 |
| 2014/0173076 A1* | 6/2014 | Ravindran | H04L 41/5058 | 709/223 |
| 2014/0192717 A1* | 7/2014 | Liu | H04W 60/00 | 370/328 |
| 2014/0337460 A1* | 11/2014 | Mohaisen | H04L 67/32 | 709/213 |
| 2015/0055557 A1* | 2/2015 | Dong | H04W 4/005 | 370/328 |
| 2016/0021567 A1* | 1/2016 | Agiwal | H04B 7/2612 | 370/329 |

OTHER PUBLICATIONS

Wang, X, et al., "Cache in the Air: Exploiting Content Caching and Delivery Techniques for 5G Systems;" IEEE Communications Magazine, IEEE Service Center, Piscataway, US; Feb. 1, 2014.

Bosunia, M. R., et al.; "Efficient Data Delivery based on Content-Centric Networking;" 2014 International Conference on Big Data and Smart Computing (BIGCOMP); IEEE, Jan. 15, 2014.

Katsaros, Konstantinos V., et al., "Information-Centric Networking for Machine-to-Machine Data Delivery: A Case Study in Smart Grid Applications;" IEEE Network; IEEE Service Center; New York, NY, US; May 1, 2014.

Matsubara, Daisuke, et al.; "Proposal of Data-Centric Network for Mobile and Dynamic Machine-to-Machine Communication;" IEICE Transactions on Communications, Communications Society, Tokyo, Japan, Nov. 1, 2013.

* cited by examiner

NODE AND METHOD FOR HANDLING INFORMATION CENTRIC NETWORKING BASED COMMUNICATIONS

This application is a 371 of International Application PCT/SE2015/050148, filed Feb. 9, 2015, which claims the benefit of U.S. Provisional Application No. 62/058,120, filed Oct. 1, 2014, the disclosure of which is fully incorporated herein by reference.

TECHNICAL FIELD

Example embodiments presented herein are directed towards a base station and wireless device, as well as corresponding methods therein, for Information Centric Networking (ICN) based communications with radio bearers.

BACKGROUND

In a typical cellular system, also referred to as a wireless communications network, wireless devices, also known as mobile stations and/or user equipment units communicate via a Radio Access Network (RAN) to one or more core networks. The wireless devices can be mobile stations or user equipment units such as mobile telephones also known as "cellular" telephones, and laptops with wireless capability, e.g., mobile termination, and thus can be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Today there are a number of techniques to deliver content to end users and devices, as well as to enable those to publish content into the network. To name a few, IP Multicasting allows multicast groups to be used for more efficient transport of media content to IP enabled terminals, by means of subscription (joining) multicast groups. In 3GPP, Multicast Broadcast Multimedia Services (MBMS, or eMBMS as it is referred to in LTE) enables the radio interface to transmit the same content to several mobile terminals of the same cell or group of cells.

SUMMARY

Today, content distribution and machine-type communication (Internet of Things, IoT) essentially rely on host-based protocols, mainly the Internet Protocol (IP). This scales poorly, but may be partly mitigated by network features such as multicasting and content caching. However, since content distribution is becoming the absolute dominant part of traffic in both fixed and mobile networks, the host based approach is increasingly struggling to cope efficiently with its task. According to the example embodiments presented herein, emerging Information/Content Centric Networking end-to-end paradigms are applied for efficient media distribution over LTE, and by extension also into 5G and 3G.

Thus, example embodiments presented herein are directed towards a base station and wireless device, as well as corresponding methods therein, for Information Centric Networking (ICN) based communications with radio bearers. The example embodiments provide a means for using ICN bearers in parallel with standard Packet Data Network (PDN) bearers.

The example embodiments presented herein have at least the following example advantages:

This example embodiments presented herein enable LTE and 5G to be positioned as the most effective wireless technology for media distribution. If WiFi is the only wireless access technology for some devices, then LTE-WiFi tethering will maintain the tight LTE-based control of CCN packets end-to-end.

LTE and other 3GPP radio access networks, provide very powerful mechanisms to address two major issues in deploying a new networking paradigm such as CCN:
  With 3GPP, we can introduce CCN-over-LTE bearers in a phased approach. In principle, this is no different from other features regularly deployed in 3GPP networks. CCN is deployed on one single RBS, or any group of RBSs. Deploying CCN-over-LTE nationwide is also not a major challenge compared to deploying many other LTE features, e.g. legal intercept, multicast/broadcast, Voice-over-LTE (VoLTE) and positioning.
  With 3GPP, control of the establishment is provided of bearers, both over the air and inside the infrastructure. This means that the distribution of media via CCN is optimized in a way that WiFi cannot, since WiFi has no split control/user plane architecture.

By combining IP-based LTE and CCN-over-LTE, the publisher mobility challenges of CCN is solved, as well as other weaknesses of a session based protocol such as CCN. With LTE, we can do this easily, by running IP over LTE over the default bearer, and other services such as VoLTE, in parallel to CCN-over-LTE. In the infrastructure, CCN traffic to and from the UE will run over the CCN network, and non-CCN traffic will run over the standard infrastructure.

LTE becomes the main vehicle for our traditional customers, the mobile network operators, to start to play a key role in media distribution. Since caching and CCN is implemented inside the network, they can now challenge other media distribution companies.

Accordingly, some of the example embodiments are directed towards a method, in a base station, ICN based communications with radio bearers. The method comprises receiving, from a wireless device, a request for content on an ICN dedicated radio bearer. The method also comprises determining if the content in the request is in a cache associated to or in the base station. If the content is cached, the method further comprises sending, to the wireless device, the content. If the content is not cached, the method further comprises sending, to an ICN based network, the request on an interface dedicated for ICN communications.

Some of the example embodiments are directed towards a base station for ICN based communications with radio bearers. The base station comprises a receiver configured to receive, from a wireless device, a request for content on an ICN dedicated radio bearer. The base station further comprises processing circuitry configured to determine if the content in the request is in a cache associated to or in the base station. The base station also comprises a transmitter. If the content is cached, the transmitter is configured to transmit, to the wireless device, the content. If the content is not cached, the transmitter is configured to transmit, to an ICN based network, the request on an interface dedicated for ICN communications.

Some of the example embodiments are directed towards a method, in a wireless device, for ICN based communications with radio bearers. The method comprises determining, via an API, a need for ICN compatible content. The method further comprises sending, to a base station, a request for content on an ICN dedicated radio bearer.

Some of the example embodiments are directed towards a wireless device for ICN based communications with radio bearers. The wireless device comprises processing circuitry configured to determine, via an API, a need for ICN compatible content. The wireless device further comprises a transmitter configured to transmit, to a base station, a request for content on an ICN dedicated radio bearer.

Definitions

3GPP 3rd Generation Partnership Project
AF Application Function
API Application Programming Interface
BSC Base Station Controller
CCN Content Centric Networking
CPRI Common Public Radio Interface
DL Downlink
DRB Data Radio Bearers
eNB evolved NodeB
EPC Evolved Packet Core
EPS Evolved Packet System
eMBMS evolved Multicast Broadcast Multimedia Services
E-UTRAN Evolved Universal Terrestrial Radio Access Network
GERAN GSM/EDGE Radio Access Network
GSM Global System for Mobile Communications
GW Gateway
HLR Home Location Register
HSS Home Subscription Service
ICN Information Centric Networking
IoT Internet of Things
IP Internet Protocol
LIPA Local IP Access
LTE Long-Term Evolution
NDN Named Data Networking
MAC Medium Access Control
M2M Machine-to-Machine
MBMS Multicast Broadcast Multimedia Services
MME Mobility Management Entity
OS Operating System
PDCP Packet Data Convergence Protocol
PDN Packet Data Network
PDU Protocol Data Unit
PGW PDN Gateway
PHY Physical Layer
RAN Radio Access Network
RBS Radio Base Station
RSL Recursive Least Square
RNC Radio Network Controller
RRC Radio Resource Control
S4-SGSN S4 Serving GPRS Support Node
SGSN Serving GPRS Support Node
SIB System Information Block
SMS Short Message Service
TCP Transmission Control Protocol
UDP User Datagram Protocol
UE User equipment
UL Uplink
UMB Ultra Mobile Broadband
UMTS Universal Mobile Telecommunications System
UTRAN Universal Terrestrial Radio Access Network
VoLTE Voice over LTE
WCDMA Wideband Code Division Multiple Access
WiFi Wireless Fidelity
WiMax Worldwide Interoperability for Microwave Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that the terms wireless device, UE and user equipment may be used interchangeably herein. It should be appreciated that all of the example embodiments presented herein may be applicable to a GERAN, UTRAN or E-UTRAN based system.

General Overview

In order to provide a better explanation of the example embodiments presented herein, a problem will first be identified and discussed. Today, content distribution in ad-hoc networks rely of host based (Internet Protocol, IP) mechanisms for content retrieval and distribution. The research community is in agreement that host based communication paradigms do not scale well as content distribution becomes the dominant part of traffic load globally. The most efficient technique is to run media optimized protocols, e.g. the Content Centric Networking (CCN) protocols "over the wire" without any IP underneath.

Another issue with current content distribution is how to reach all the way to the terminals that are served. Ideally, content traffic to terminals will follow a path where all traffic is carried using CCN over the wire and end-to-end, i.e. not CCN layered on top of IP. However, since it is inherently difficult to predict exactly how terminals connect to a network (e.g. via a public WiFi hotspot, or via a private hotspot in the home or other), supporting CCN would require a forklift of the entire Internet. Thus, it is extremely challenging in today's networks to start to introduce CCN. One could create walled gardens, e.g. virtual groups, but these would then typically require IP underneath, as a bridge between CCN islands, thus counteracting the intention of efficient media distribution.

Another issue with CCN is that it is session based, e.g. the UE needs to send an interest packet towards the network, after which it will get the content back. In most scenarios with CCN, the idea is to only use CCN to the terminals, which in turn requires that non-session based protocols, e.g. TCP/IP, be emulated over CCN. This adds ample complexity to CCN.

A third issue with CCN is that it currently doesn't support publisher mobility although there are research proposals to that end. So if a wireless device connected to an access point moves from that access point to another access point, CCN has no support to find the new access point and inform the rest of the CCN community. To deal with this, many mechanisms have been proposed, but none that makes inherent use of mobility management inherent to 3GPP networks.

Overview of Some of the Example Embodiments

When a LTE UE connects to a LTE network, according to 3GPP it will automatically establish a default bearer towards a PDN Gateway (PGW). This bearer will provide the always-on connectivity inherent to LTE.

Some of the example embodiments are directed towards a method for establishing another bearer which is used for the purpose of carrying ICN/CCN (Information/Content Centric Networking Protocols) "over-the-wire" or rather "over-the-radio-bearer". The latter implies that the UE in the Uplink direction (UL) will map e.g. CCN PDUs straight into the radio bearer established for that purpose. That CCN PDU will at some point inside the network, typically on the macro RBS or a small cell deployed in a hotspot such as a shopping mall, be extracted and injected into a CCN-enabled network, and vice-versa in the Downlink direction (DL).

The above operational model would be in accordance with 3GPP standards in the radio access network (RAN), in particular the use of local break out of bearers, e.g. as is done for Local IP Access (LIPA) in 3GPP.

On the UE, both CCN and host based sockets (for TCP/UDP/IP) will be available, so that parallel host-based and CCN-based communication is supported. Alternatively, the use of CCN on the UE will be implemented inside the modem parts, so that the UE applications use their normal TCP/IP APIs but 3GPP compliant filters inside the UE modem will direct the CCN packets over the CCN bearer in a way transparent to the applications. The IP layer would then just be a dummy layer that is used to simplify the interaction with the API eco system.

Publisher mobility mechanisms, when UEs are the publishers, shall rely on reuse of 3GPP facilities in support of mobility management and control.

Example embodiments presented herein are directed towards a base station and wireless device, as well as corresponding methods therein, for Information Centric Networking (ICN) based communications with radio bearers. The example embodiments provide a means for using ICN bearers in parallel with standard Packet Data Network (PDN) bearers.

In the future Networked Society, virtually all devices will be wireless. It is likely that both LTE/5G and WiFi will play a key role in delivering the necessary wireless links to all those devices.

The example embodiments presented herein may apply to LTE and its evolution towards 5G. The latter will most likely be an evolution of LTE in higher frequency bands, and LTE with different scaling than today (e.g. up-scaled bandwidth and down-scaled transmission time intervals for lower latency, etc.). LTE has proven to be very robust in its basic structures and there is little evidence to suggest that its fundamentals will change.

Over the air interface, LTE makes use of radio bearers, which provide separate logical channels of various QoS and other characteristics. Combined with the equivalent bearers on the core side, the radio bearers form the so called EPS (Evolved Packet Service) Bearers. An EPS typically ties the UE to some internet interface outside of the mobile network.

Figure 1:
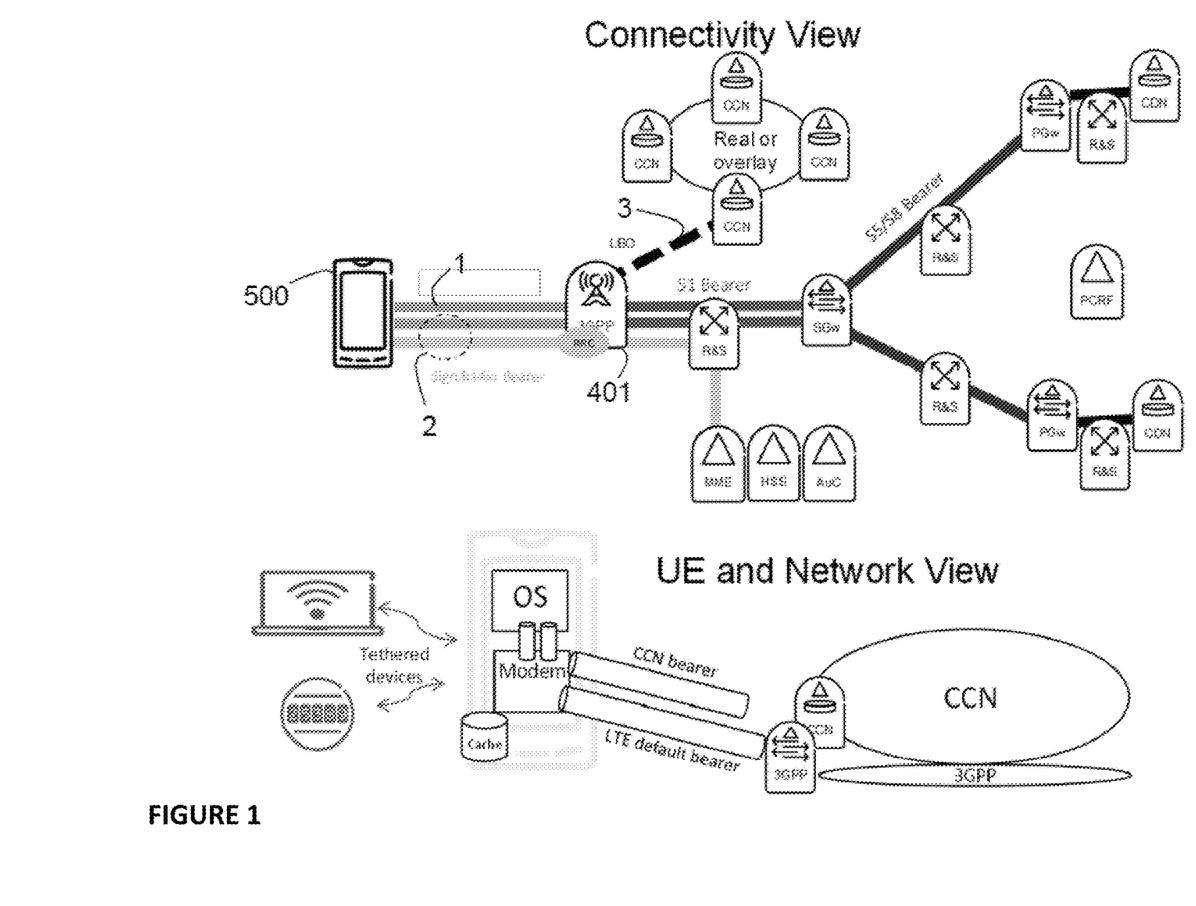
FIG. 1 is an illustrative example of a wireless network featuring ICN and IP based components, according to some of the example embodiments.

FIG. 1 illustrates an example network in which the example embodiments may be applied. When a LTE UE, or wireless device 500, connects to a LTE network, according to 3GPP it will automatically establish a default EPS bearer towards a PDN Gateway (PGW), for example the bearers 2 in FIG. 1. This bearer will provide the "always-on" connectivity inherent to LTE. This always-on connectivity provides the IP-presence of LTE UEs.

The LTE core network determines when to establish additional bearers aside the default one. The core network will do so in cooperation with the signaling entities on the UE.

According to some of the example embodiments, the UE installs a CCN API providing CCN sockets or similar to the UE applications making use of CCN for various purposes, e.g. content distribution, Internet-of-Things, and software upgrades from the network side to devices of various kinds, e.g. cellular phones, meters, actuators etc.

Based on some default or other mechanism, which could be triggered through policy and/or subscription and availability (e.g. the 3GPP HLR/HSS, Home Location register/Home Subscription Service), the network will recognize the UE as CCN-capable. It will then signal to the UE that a new dedicated bearer, for example bearer 1, be established alongside the default bearer, for example bearer 2. The idea is to use this new bearer to carry CCN traffic "natively" over the radio interface. The network, in this case the MME, will of course know that that particular radio bearer shall be terminated on the RBS and connected to some adjacent CCN network, i.e. similar to what is used today for local break-out of LTE bearers (e.g. LIPA, 3GPP's Local IP Access solution). Logically this CCN network is separate from the IP network used for regular 3GPP bearers. Contrary to LIPA however, the MME will typically just make sure that the radio bearer is terminated to a CCN network connected to the RBS, with no further actions from the MME to the CCN network beyond that.

In case the APIs on the UE 500 prefer to use traditional IP sockets for CCN this shall not be excluded from the example embodiments. In this case, CCN will be carried over a dummy IP interface that is transported over the CCN bearer. On the RBS 401, this dummy IP address will be terminated and traffic treated as if CCN traffic had not used IP.

In case the media device on the end-user side is connected via WiFi, the example embodiments presented herein still apply, as illustrated in FIG. 1. For example, a WiFi-only TV set will need to connect to a WiFi-LTE tethering device, which will act as a proxy to distribute the CCN media packets from LTE towards the local WiFi connection. By using tethering towards WiFi, the solution still secures an end-to-end control of CCN distributed media over LTE. Such example embodiments could make use of WiFi multicasting on the radio access side.

In case devices (UEs) have caching capabilities, the solution shall allow for reuse of LTE eMBMS (enhanced Multicast Broadcast Multimedia Services) such that the CCN node serving the RBS may inject eMBMS packets towards the RAN and thus act in the role of MBMS GW. Nor shall any future bearers be excluded from the example embodiments presented herein, e.g. group data radio bearers.

The CCN bearer established can be devised along several schemes:
  A dedicated bearer for uplink and downlink.
  A dedicated bearer for uplink but combined with a MBMS bearer downlink. In this scheme, CCN traffic from the UEs will relate a MBMS multicast channel in the downlink to the aforementioned uplink. This alternative is preferred in situations of heavy radio air interface load.

Working Example

Figure 2:
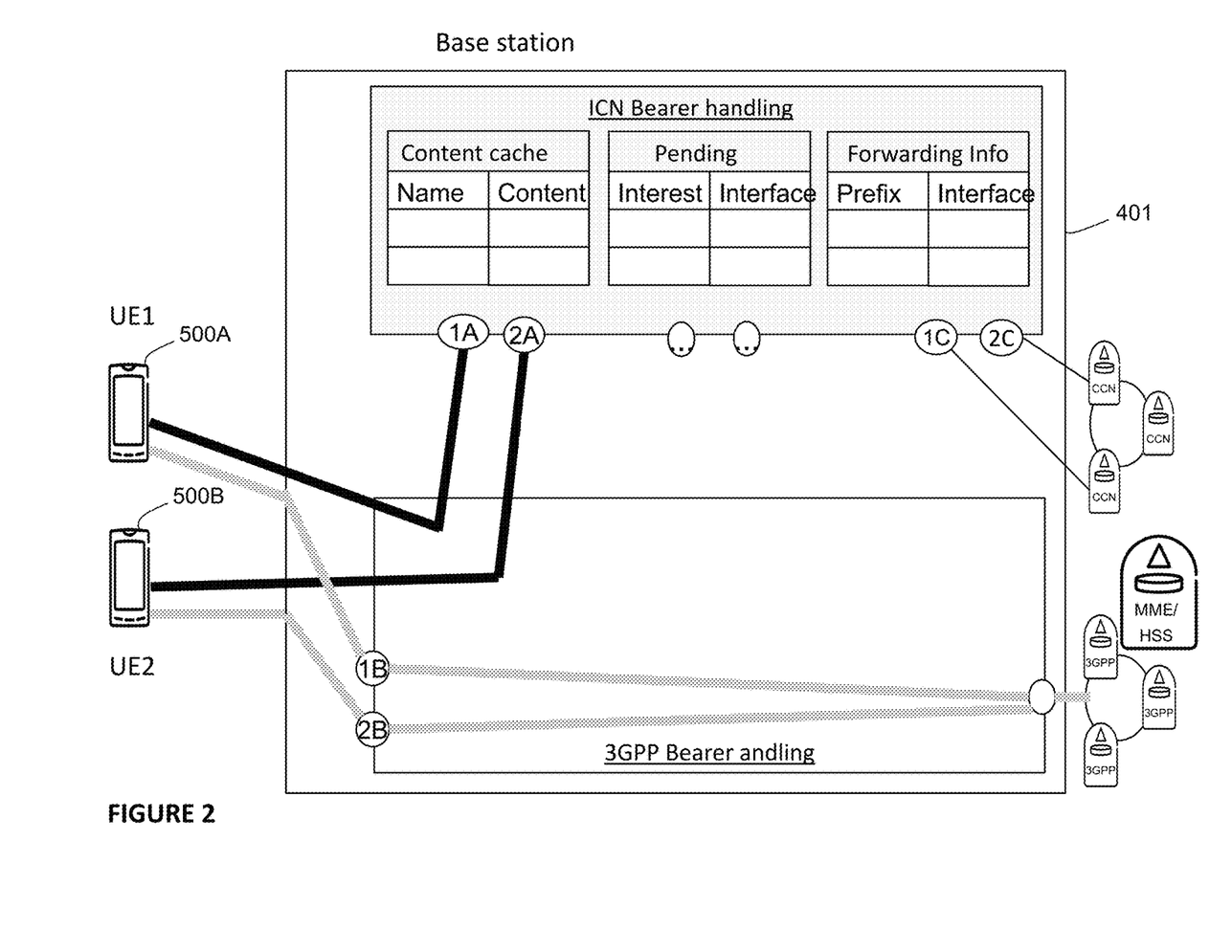
FIG. 2 is an illustrative working example of the bearer connections between a wireless device and a base station, according to some of the example embodiments.

FIG. 2 illustrates a non-limiting working example of some of the example embodiments presented herein. In general, when UE1 and UE2 roam into the cell or are switched on in the cell, a default LTE EPS bearer (Evolved Packet Service) will be established automatically, e.g. over interface 1 for UE 1 and interface 2 for UE2. This bearer will carry standard LTE traffic, IP based. From the base station, those bearers will be tunneled into nodes of the 3GPP network and typically eventually end up in a Packet Data Network gateway (PGw) of the Evolved Packet Core that connects to the Internet.

The above bearers will provide the terminals with "always-on" connectivity of the UEs During the process of bearer establishment, the MME/HSS in the EPC core will determine that UE1 and UE2 are ICN-capable, i.e. that they have the capabilities to use ICN protocols on the UE, e.g. to send an Interest Message for a content file or that have the capabilities to inject content into ICN At this point, the MME will cooperate (signal) with the UE1 and U2 to establish a separate bearer, to be used by ICN APIs on the UE side. This will be along standard 3GPP procedures for radio data bearer establishment.

The base station will also know that those ICN bearers shall be terminated locally on the ICN bearer handling entity, so when these new bearers have been established the base station will create new ICN interfaces for UE1 and UE2, e.g., interfaces 1A and 2A respectively, on the ICN bearer handling entity residing inside the base station.

The base station will then make sure to terminate radio interface protocols from UE1 and UE2 for those bearers and then forward whatever it receives from UE1 on the dark shaded bearer to i/f 1A and whatever it receives from UE2 on the dark shaded bearer on i/f 2A.

Note that when UE1 connects to Base Station, then this will be registered in Forwarding Info (e.g. Prefix UE1; Interface 1A), so that an Interest from some other device in the ICN network can propagate towards UE1.

If the UEs move to another cell, handover of standard 3GPP bearers will be according to well-known seamless mobility management procedures involving signaling between MME, base station and UE. As for the ICN bearers, they don't need seamless mobility. Instead, the procedure of above can be repeated.

When a UE moves out of cell coverage and into a new cell, Forwarding Info in the ICN bearer handling will be deleted from the, unless the Base Station is instructed to keep specific data in its cache, even though the source has moved. For example, if UE1 has published a picture via interface 1A, and then this picture is cached in the base station's Content Cache, then the strategy might be chosen in this network to keep this data in the Base Station's cache for an extended time, even though the UE itself has moved.

FIG. 2 provides an illustrative example of the bearer connections between two wireless devices 500A and 500B and a base station 401. In the illustrated example, each wireless device 500A and 500B comprises two bearers. The first wireless device 500A comprises an ICN dedicated bearer 1A and a PDN dedicated bearer 1B. The second wireless device 500B similarly comprises an ICN dedicated bearer 2A and a PDN dedicated bearer 2B.

According to some of the example embodiments, an API associated with the wireless device may determine that the wireless devices requests content which is ICN compatible. Based on this determination, the wireless device 501A may send a request for content to the base station 401 on the ICN dedicated bearer 1A. The request for content will comprise the name of the content the wireless device 501A wishes to receive.

Once the base station 401 receives the request for content, the base station 401 will recognize the request is intended for an ICN based network since the request was received on the ICN dedicated bearer 1A. According to some of the example embodiments, upon receiving the request for content, the base station 401 may first search a content cache to see if the requested content is cached within the base station. According to some of the example embodiments, the content may be indexed according to the name associated with the content. If the base station 401 determines that the requested content is cached, the base station may send the requested content to the wireless device 501A via the ICN dedicated bearer 1A. Thus, the wireless device 500A may receive the requested content without any messaging to the ICN based network, thereby reducing the amount of signaling resources used.

If it is determined that the requested content is not cached within the base station 401, the base station may register the requested content within a pending table. The pending table may keep track of all the different ICN based content requests that the base station 401 receives from the various wireless devices the base station serves. If it is determined that a certain content is requested often, for example, if the number of requests surpasses a predetermined threshold value, the base station may decide to cache the content in the content cache thereby avoiding the need to communication with the ICN based network.

According to some of the example embodiments, each base station 401 may have a dedicated interface 3 between itself and the ICN based network, as illustrated in FIG. 1. It should be appreciated that in FIG. 1, the interface 3 is used by all wireless devise connected via an ICN bearer to the base station 401. Thus, there need not be a dedicated ICN based network interface per wireless device.

In FIG. 2, the interface between the base station 401 and the ICN based network are interfaces 1C and 2C, in this case there are two interfaces. Thus, in the forwarding table, the base station 401 may take note of which content it is expected to receive and on which interface it is expected to receive it on. For example, if wireless device 500A requests content named 'Video 1', assuming that this content is not already cached on the base station, this interest in 'Video 1' will first be registered in the Pending Table. The prefix of the forwarding table may be 'Video 1' and the interface may be listed as 1A. The base station will propagate the interest in 'Video 1' to that interface. Thus, once the base station receives this data on interface 3A or 3B, the base station will know, by looking into the Pending table, that the data shall forwarded to the wireless device 500A on the dedicated ICN bearer 1A.

It should be appreciated that during the operations described above, the base station may also be configured to handle communications for the wireless device 500A via the PDN based bearer 1B in parallel. Furthermore, it should be appreciated that the base station 401 may also simultaneously be configured to handle any form for communications, ICN based or IP based, from any number of other wireless devices, for example, wireless device 500B. The example embodiments provide a means for using ICN bearers in parallel with standard Packet Data Network (PDN) bearers.

Thus, in summary, the example embodiments described herein may be used to:
- Use 3GPP bearer control to terminate/originate data radio bearers (DRBs), from/to a UE, onto a ICN/CCN enabled network that operates in parallel to the existing 3GPP end-to-end network encompassing the normative end-to-end EPS bearers.
- Also including the situation where UEs are preprogrammed to establish an ICN/CCN bearer by default whenever they have this option.
- Enable the emulation of the MBMS GW role on the point where the ICN/CCN traffic is sent/received to/from the UEs.
- Using mobility management facilities of 3GPP systems to provide better support for publisher mobility of ICN/CCN nodes.
- Enriching capillary (e.g. WiFi, Bluetooth, ZigBee etc)-to-3GPP tethering devices such that they can cache content (e.g. IoT or media) locally for distribution towards non-3GPP devices, according to the bearer mechanisms of this invention.
- Controlling the UE from the network so that CCN bearers are established, or content is distributed over an IP enabled bearer (new or existing).
- Applying the above for any version of ICN, NDN (Named Data Networking) etc.
- Using System Information Blocks (SIB) or similar to inform about the ICN/CCN bearers.
- Provide mechanisms on the UE (modem level or OS level or application level) in support of bearer selection depending on radio, core etc. e.g. where one application on a UE is instructed to switch socket interface from TCP/IP to ICN/CCN or vice versa, or where this switch is performed transparently to application and sockets, e.g. inside the modem
- Use 3GPP traffic flow templates and related constructs to identify which traffic is to be carried over the ICN/CCN bearer(s).
- Allow different ICN/CCN bearers to be used over different ICN/CCN logical domains, e.g. for roaming users.
- Adapt the radio scheduler on the modems (UE and/or RBS) to adapt to ICN/CCN characteristics, e.g. in how resources are scheduled.
- Use carrier aggregation (LTE, WCDMA, GSM, LTE unlicensed, WiFi, 5G etc) for the purpose of ICN/CCN bearers.
- Treating other types of radio bearer mechanisms the same way as in applicable claims above, e.g. for spurious machine-type communication from wireless devices using GSM SMS to publish IoT (Internet of Things) data into the ICN/CCN network.
- Introducing ICN/CCN all the way to 3GPP UEs by means of similar procedures as 3GPP feature rollout, e.g. on a few RBS, in a region, across many countries for a multinational operator etc.
- Applying the above for indoor usage or any other heterogeneous (mix of small cell, large cells) or homogeneous network.
- Equipping RBSs with ICN/CCN capabilities that terminate and originate ICN/CCN traffic.
- Using the above principles also in cases where a virtual RAN or similar construct is employed, e.g. when the RBS's RAN is split into a lower layer part (e.g. PHY, MAC, RLS) and a higher level part (e.g. PDCP, RRC) including where IP bearer PDCPs are located elsewhere compared to ICN/CCN bearer PDCPs or equivalent.
- Combining this invention with the use of CPRI or similar, e.g. in the case where CPRI or equivalent packets/frames of one antenna-carrier flow is switched to an ICN/CCN node.
- The use of the above methods in situations where ICN/CCN is carried over one frequency band or equivalent and where other traffic (e.g. IP) is carried over a different band.

Example Node Configurations

Figure 3:
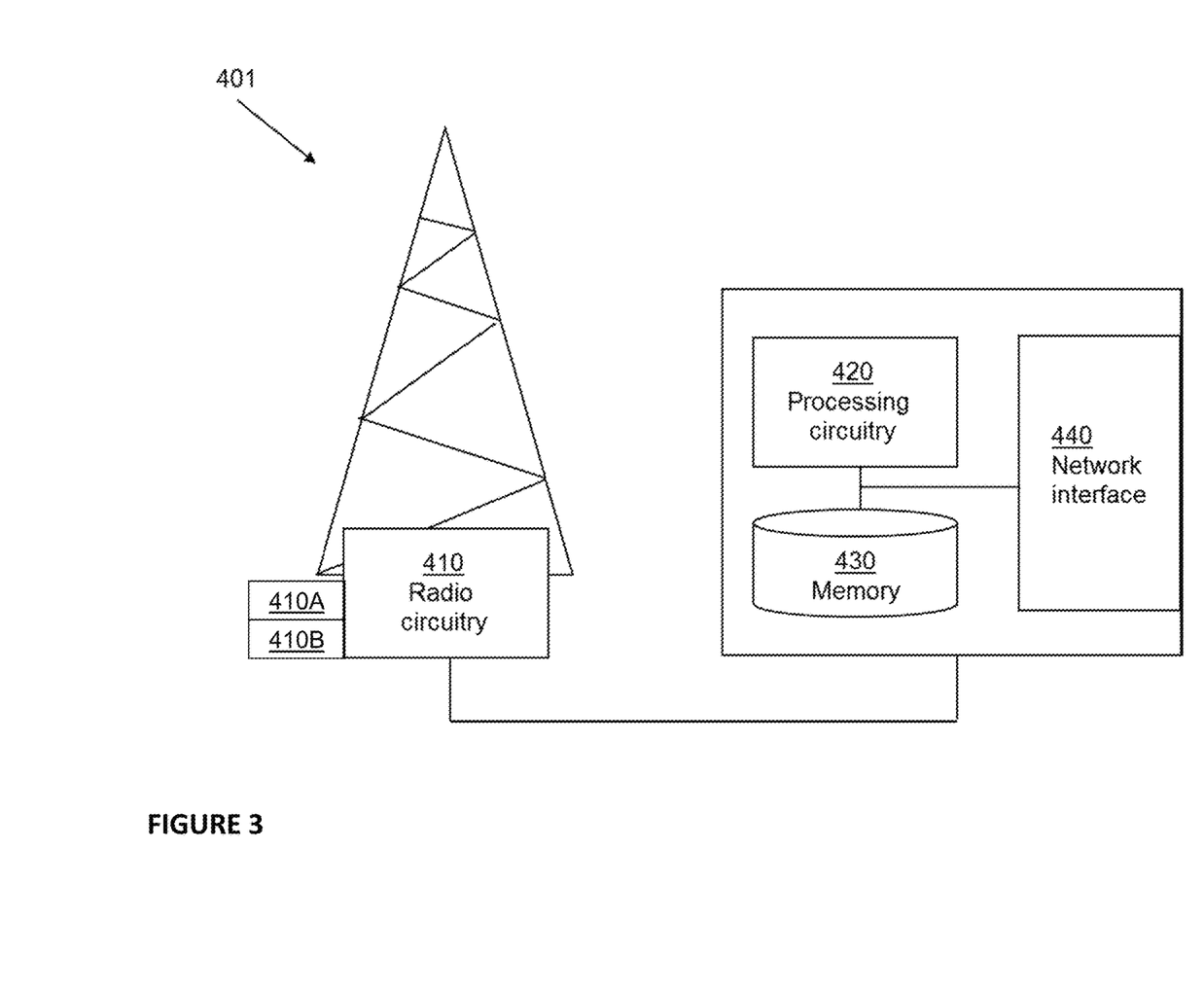
FIG. 3 is an example node configuration of a base station, according to some of the example embodiments.

FIG. 3 illustrates an example node configuration of a base station 401. The base station 401 may perform some of the example embodiments described herein. The base station 401 may comprise radio circuitry, a communication port or a receiver 410A and transmitter 410B that may be configured to receive and/or transmit communication data, instructions, messages and/or any information related to ICN and PDN bearer based communications. It should be appreciated that the radio circuitry, a communication port or a receiver 410A and transmitter 410B may be comprised as any number of transceiving, receiving, and/or transmitting units, modules or circuitry. It should further be appreciated that the radio circuitry, a communication port or a receiver 410A and transmitter 410B may be in the form of any input or output communications port known in the art. The radio circuitry, a communication port or a receiver 410A and transmitter 410B may comprise RF circuitry and baseband processing circuitry (not shown).

The base station 401 may also comprise a processing module, unit or circuitry 420 which may be configured for ICN based communications with radio bearers as described herein. The processing circuitry 420 may be any suitable type of computation unit, for example, a microprocessor, digital signal processor (DSP), field programmable gate array (FPGA), or application specific integrated circuit (ASIC), or any other form of circuitry.

The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, any form of information and/or executable program instructions. The base station 401 may further comprise a network interface 440 that may be configured to interact with a PDN or IP based network as well as a ICN based network as described herein.

Figure 4:
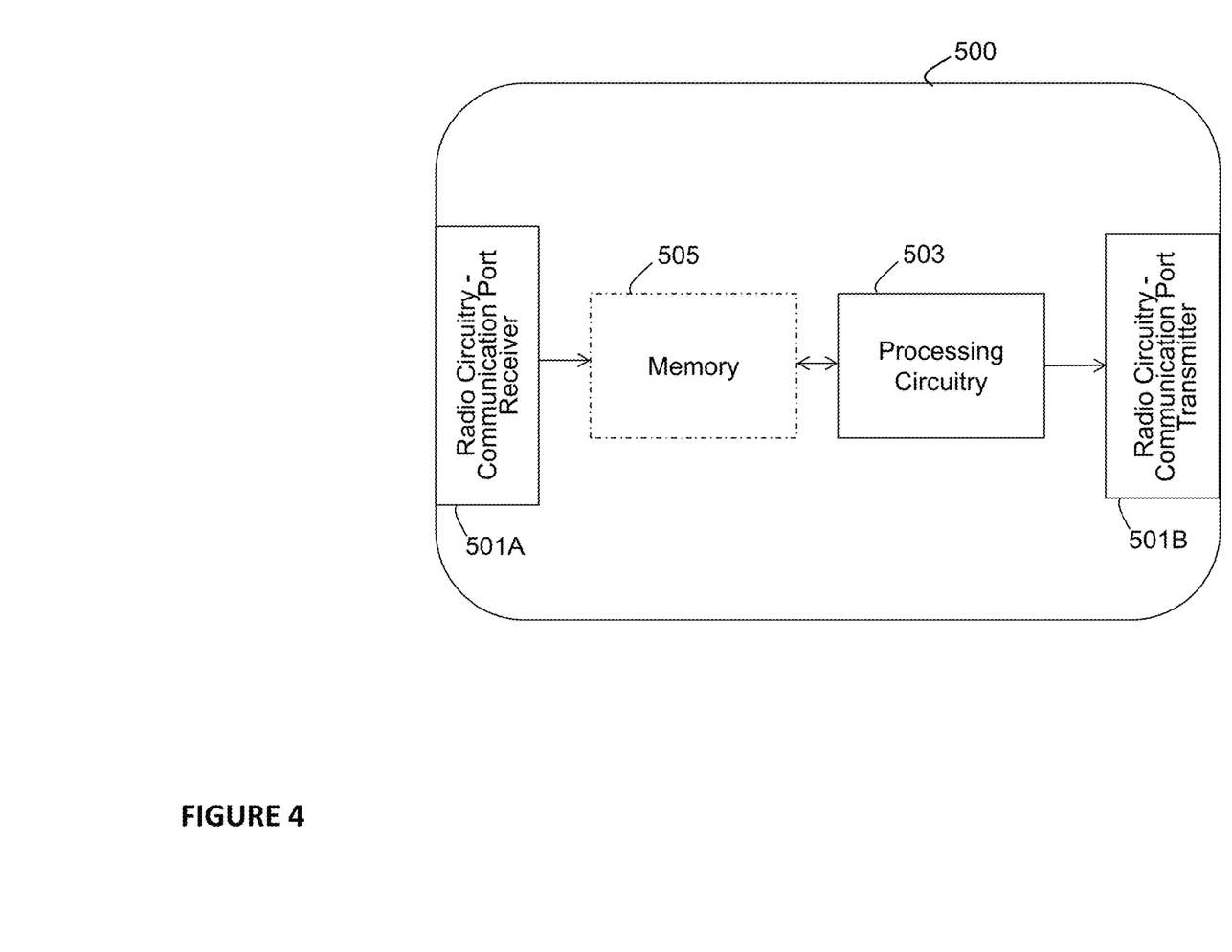
FIG. 4 is an example node configuration of a wireless device, according to some of the example embodiments.

FIG. 4 illustrates an example node configuration of a wireless device 500. The wireless device 500 may perform some of the example embodiments described herein. The wireless device 500 may comprise radio circuitry, a communication port or a receiver 510A and transmitter 510B that may be configured to receive and/or transmit communication data, instructions, messages and/or any information related to ICN and PDN bearer based communications. It should be appreciated that the radio circuitry, a communication port or a receiver 510A and transmitter 510B may be comprised as any number of transceiving, receiving, and/or transmitting units, modules or circuitry. It should further be appreciated that the radio circuitry, a communication port or a receiver 510A and transmitter 510B may be in the form of any input or output communications port known in the art. The radio circuitry, a communication port or a receiver 510A and transmitter 510B may comprise RF circuitry and baseband processing circuitry (not shown).

The wireless device 500 may also comprise a processing module, unit or circuitry 503 which may be configured for ICN based communications with radio bearers as described herein. The processing circuitry 503 may be any suitable type of computation unit, for example, a microprocessor, digital signal processor (DSP), field programmable gate array (FPGA), or application specific integrated circuit (ASIC), or any other form of circuitry.

The wireless device 500 may further comprise a memory unit or circuitry 505 which may be any suitable type of computer readable memory and may be of volatile and/or non-volatile type. The memory 505 may be configured to store received, transmitted, and/or measured data, device parameters, communication priorities, any form information and/or executable program instructions.

Example Node Operations

Figure 5A:
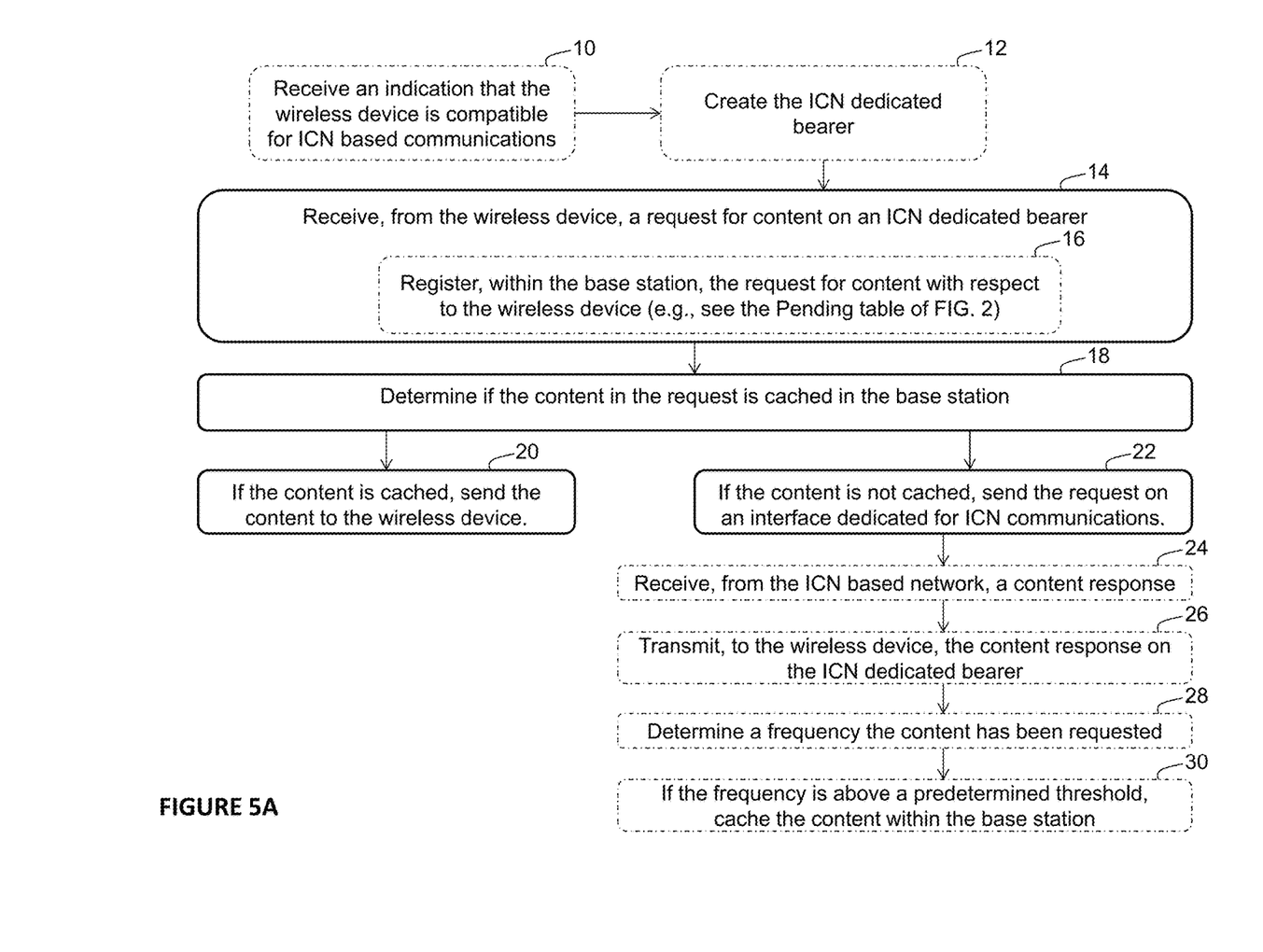
FIG. 5A is a flow diagram depicting example operations that may be taken by the base station of FIG. 3, according to some of the example embodiments.

FIG. 5A is a flow diagram depicting example operations which may be taken by the base station 401 as described herein for ICN based communications. It should also be appreciated that FIG. 5A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 5B:
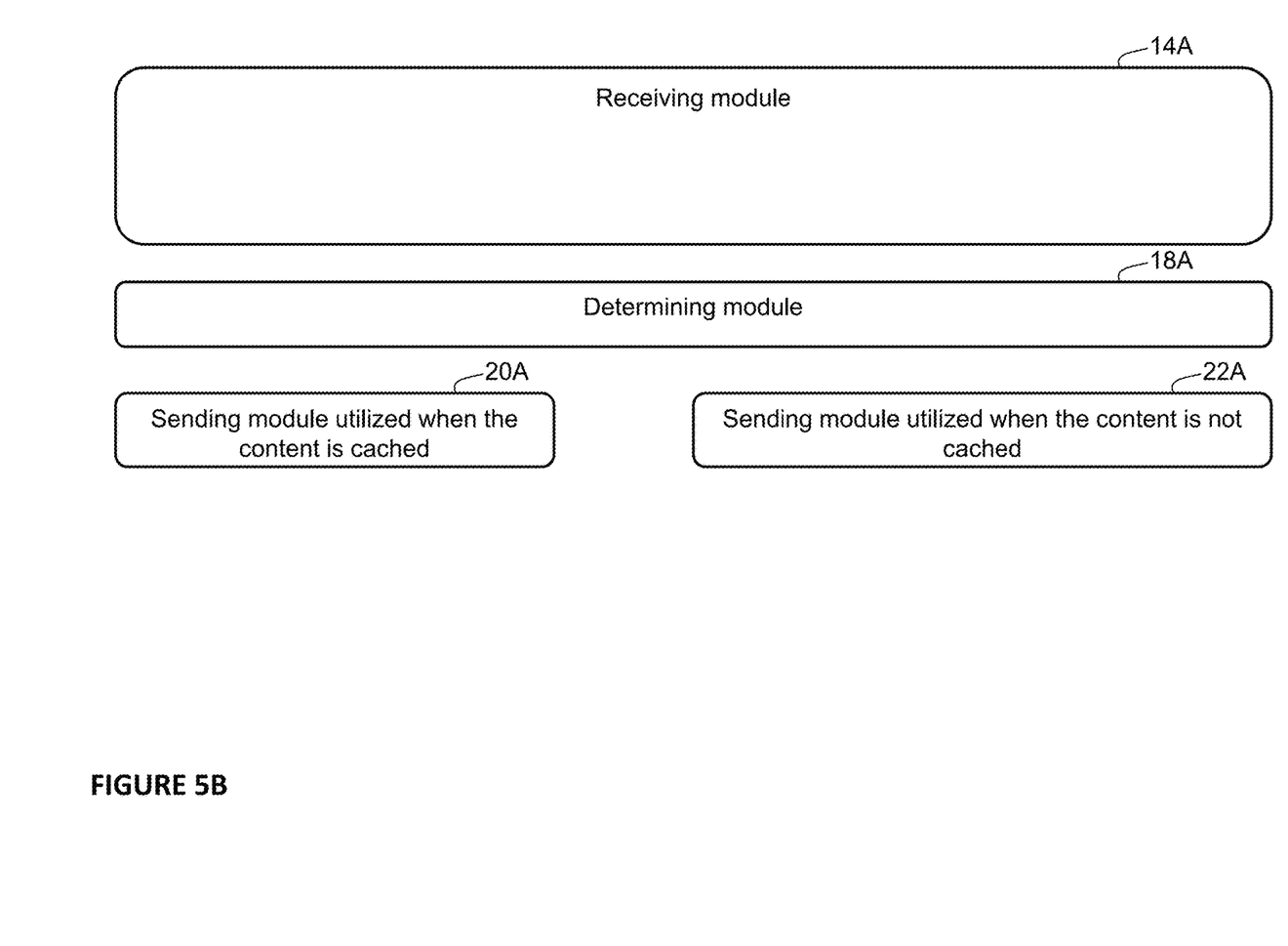
FIG. 5B is an illustrative example of modules which may carry out the example operations of FIG. 5A.

FIG. 5B illustrates modules which may carry out at least some of the example operations illustrated in FIG. 5A.

Example Operation 10

According to some of the example embodiments, the base station may be configured to receive 10 an indication that the wireless device is compatible for ICN based communications. The receiver 410A may be configured to receive the indication that the wireless device is compatible for ICN based communications.

According to some of the example embodiments, the receiving 10 may occur during an attach procedure when the wireless device connects to the network the base station is serving. The indication, which the base station receives, may be sent by a mobility management node, for example, a MME, SGSN, or a S4-SGSN. The mobility management node may determine the need for th indication based on any policies or subscription data related to the wireless device. Such policy or subscription data may be obtained from the HSS or HLR or any similar nodes such as a policy manager.

Example Operation 12

According to some of the example embodiments, upon receiving 10 the indication, the base station may create 12 the ICN dedicated bearer. The processing circuitry 420 is configured to create the ICN dedicated bearer in response to the indication.

Operation 14

The base station is configured to receive, from a wireless device, a request for content on an ICN dedicated radio bearer. The receiver 410A is configured to receive, from the wireless device, the request for the content on the ICN dedicated bearer. The receiving module 14A is further configured to perform the receiving 14.

It should appreciated that the base station is comprised in an IP based wireless communications network. For example, a LTE, GERAN, UTRAN, E-UTRAN, Wi-Fi based system. This IP based wireless communications network works in parallel to the ICN based communications, so that host based protocols use IP based communications and content centric communications use ICN based communications. The IP and ICN based communications are logically separate but may be implemented on common resources. Radio bearers carrying ICN traffic are terminated on ICN and need not be processed by the IP base communications.

According to some of the example embodiments, the content is multimedia data. It should be appreciated that multimedia data may comprise any form of or a combination of text, audio, still images, animation, video, or interactivity content forms. Multimedia data may also comprise any data related to the Internet of Things and/or any software upgrades. It may also comprise emulation of host-based communications emulated over ICN.

According to some of the example embodiments, the wireless device is a M2M device. In such example embodiments, the content may be M2M related data. According to some of the example embodiments, M2M related data may comprise measurements obtained by the M2M device. In such example embodiments, the base station may cache such data. Thus, when the ICN based networks sends a requests for such data, the base station may send the information to the ICN based network rather than attempting to send the request to the M2M device. As the M2M device typically engages in long sleep cycles where it is not reachable by the network, the ability of the base station to cache such information is advantageous as it reduces unnecessary signaling.

Example Operation 16

According to some of the example embodiments, the base station may be further configured to register 16, within the base station itself, the request for content with respect to the wireless device. The processing circuitry 420 is configured to register, within the base station itself, the request for content with respect to the wireless device.

According to some of the example embodiments, the base station may be configured to provide a book keeping of the various ICN content based requests it receives. By doing so, the base station may decide to cache content which is frequently requested.

Furthermore, in some instances, the wireless device may wish to send content to the ICN based network, therefore the request may comprise data to be transmitted. In such instances, the base station may transmit this data or cache this data and send the cached data to the ICN based network once the base station receives a request from the ICN based network for such data.

Operation 18

The base station is further configured to determine 18 if the content in the request is in a cache associated to or in the base station. The processing circuitry 420 is configured to determine if the content in the request is in a cache associated to or in the base station. The determining module 18A is further configured to perform the determining.

Operation 20

Based on the determining 18, if the content is cached, the base station is further configured to send 20, to the wireless device, the content. The transmitter 410B is configured to send, to the wireless device, the content if the content is cached. The sending module 20A is further configured to perform the sending 20.

Operation 22

Based on the determining 18, if the content is not cached, the base station is further configured to send 22, to an ICN based network, the request on an interface dedicated for ICN communications. The transmitter 410B is configured to send, to an ICN based network, the request on an interface dedicated for ICN communications if the content is not cached. The sending module 22A is further configured to perform the sending 22.

According to some of the example embodiments, the interface dedicated for ICN communications is further dedicated for communications to and from the wireless device.

Example Operation 24

According to some of the example embodiments, the base station is further configured to receive 24, from the ICN based network, a content response. The receiver 410A is configured to receive, from the ICN based network, the content response.

According to some of the example embodiments, the content request and response are transmitted and received on a first frequency and general IP communications are transmitted and received on a second frequency, wherein the first frequency is different than the second frequency.

If information has been requested in the content request, the content response may comprise the requested information. If the content request comprised a request to send information to the ICN based network, the content response may comprise a confirmation that such information was transmitted.

Example Operation 26

Upon receiving 24 the content response, the base station is further configured to transmit 26, to the wireless device, the content response on the ICN dedicated radio bearer. The transmitter 410B is configured to transmit, to the wireless device, the content response on the ICN dedicated radio bearer.

According to some of the example embodiments, the content request and response are transmitted and received on a first frequency and general IP communications are transmitted and received on a second frequency, wherein the first frequency is different than the second frequency.

If information has been requested in the content request, the content response may comprise the requested information. If the content request comprised a request to send information to the ICN based network, the content response may comprise a confirmation that such information was transmitted.

Example Operation 28

Upon the receiving 24 and transmitting 26, the base station may be further configured to determine 28 a frequency in which the content has been requested. The processing circuitry 420 is configured to determine the frequency in which the content has been requested.

According to some example embodiments, if the base station determines that the content which has been requested is often requested, the base station may choose to cache the content thereby reducing the amount of signaling required in order to supply the wireless device with the requested content. Specifically, by caching the content, the base station may eliminate the need of sending the request to the ICN based network in the future.

Example Operation 30

Upon determining 28 the frequency in which the content has been requested, the base station is further configured to cache 30 the content within the base station itself if the frequency is above a predetermined threshold. The processing circuitry 420 is configured to cache the content within the base station itself if the frequency is above a predetermined threshold.

According to some example embodiments, if the base station determines that the content which has been requested is often requested, the base station may choose to cache the content thereby reducing the amount of signaling required in order to supply the wireless device with the requested content. Specifically, by caching the content, the base station may eliminate the need of sending the request to the ICN based network in the future.

Figure 6A:
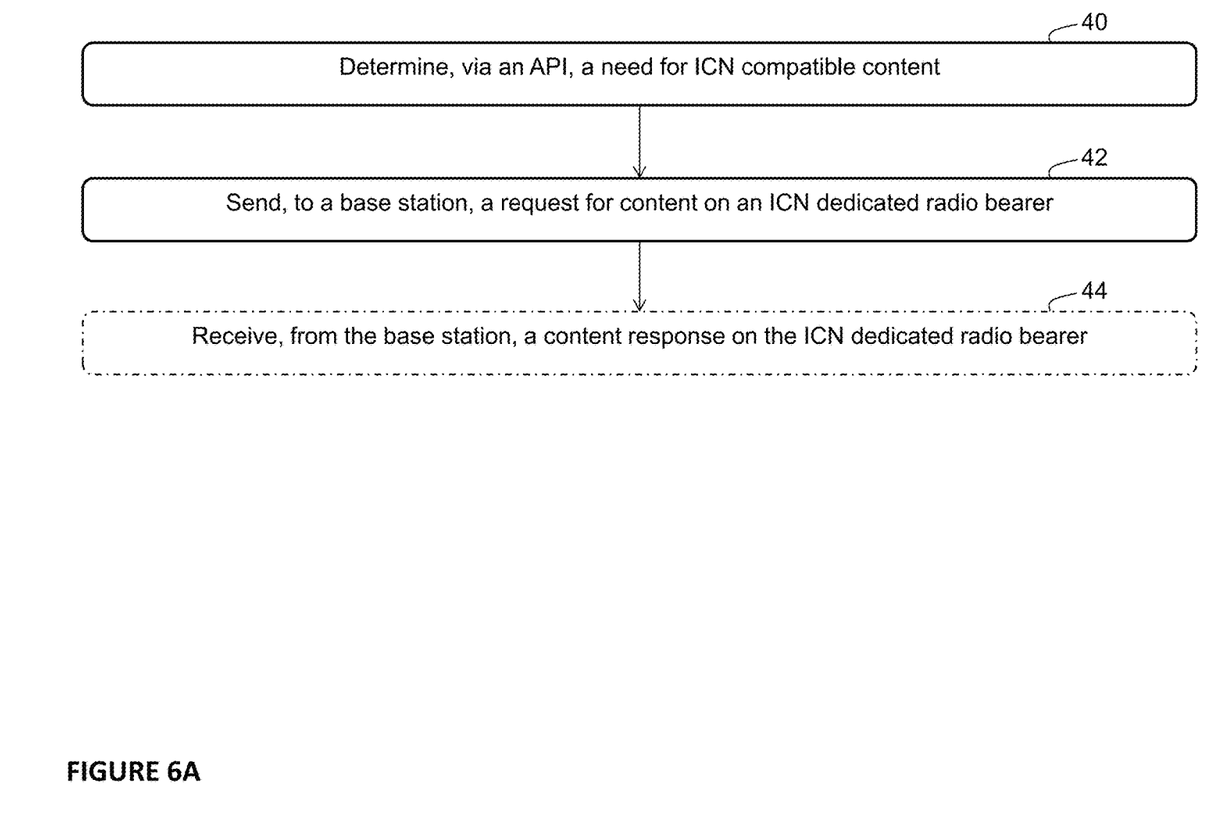
FIG. 6A is a flow diagram depicting example operations that may be taken by the wireless device of FIG. 4, according to some of the example embodiments.

FIG. 6A is a flow diagram depicting example operations which may be taken by the wireless device 500 as described herein for ICN based communications. It should also be appreciated that FIG. 6A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Figure 6B:
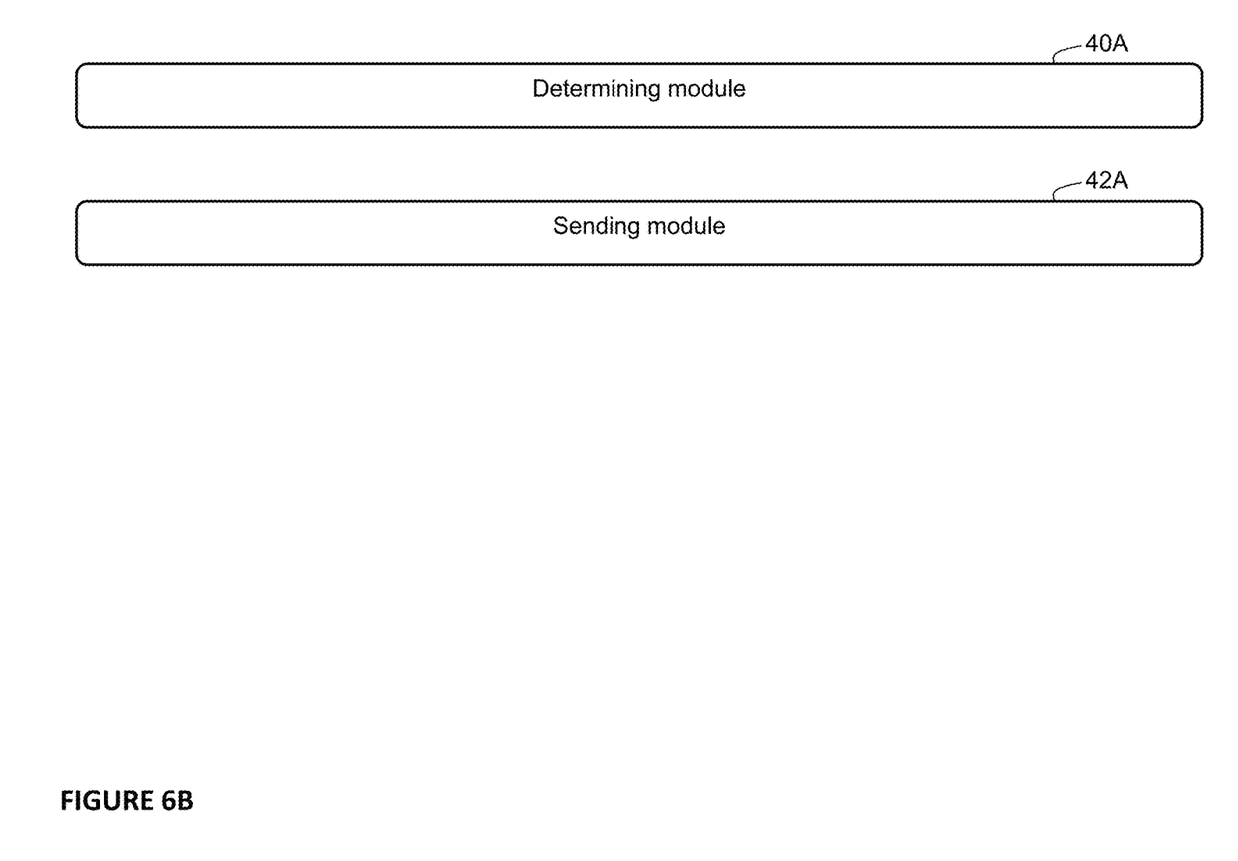
FIG. 6B is an illustrative example of modules which may carry out the example operations of FIG. 6A.

FIG. 6B illustrates modules which may be used to perform at least some of the example operations illustrated in FIG. 6A.

Operation 40

The wireless device is configured to determine 40, via an API, a need for ICN compatible content. The processing circuitry 503 is configured to determine, via the API, the need for ICN compatible content. The determining module 40A is configured to perform the operation of determining 40.

According to some of the example embodiments, the content is multimedia data. It should be appreciated that multimedia data may comprise any form of or a combination of text, audio, still images, animation, video, or interactivity content forms. Multimedia data may also comprise any data related to the Internet of Things and/or any software upgrades. It may also comprise any data related to the Internet of Things and/or any software upgrades. It may also comprise emulation of host-based communications emulated over ICN.

According to some of the example embodiments, the wireless device is a M2M device and the content is M2M related data. According to some of the example embodiments, M2M related data may comprise measurements obtained by the M2M device. In such example embodiments, the base station may cache such data. Thus, when the ICN based networks sends a requests for such data, the base station may send the information to the ICN based network rather than attempting to send the request to the M2M device. As the M2M device typically engages in long sleep cycles where it is not reachable by the network, the ability of the base station to cache such information is advantageous as it reduces unnecessary signaling.

Operation 42

Upon the determining 40, the wireless device is further configured to send 42, to a base station, a request for content on an ICN dedicated radio bearer. The transmitter 501B is configured to send, to the base station, the request for content on the ICN dedicated radio bearer. The sending module 42A is configured to perform the operation of sending 42.

It should appreciated that the base station is comprised in an IP based wireless communications network. For example, a LTE, GERAN, UTRAN, E-UTRAN, Wi-Fi based system. This IP based wireless communications network works in parallel to the ICN based communications, so that host based protocols use IP based communications and content centric communications use ICN based communications. The IP and ICN based communications are logically separate but can be implemented on common resources. Radio bearers carrying ICN traffic are terminated on ICN and need not be processed by the IP base communications.

Example Operation 44

According to some of the example embodiments, the wireless device may be further configured to receive 44, from the base station, a content response on the ICN dedicated radio bearer. The receiver 501A is configured to receive, from the base station, the content response on the ICN dedicated radio bearer.

According to some of the example embodiments, the content request and response are transmitted and received on a first frequency and general IP communications are transmitted and received on a second frequency, wherein the first frequency is different than the second frequency.

If information has been requested in the content request, the content response may comprise the requested information. If the content request comprised a request to send information to the ICN based network, the content response may comprise a confirmation that such information was transmitted.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a base station, for Information Centric Networking (ICN) based communications with radio bearers, the method comprising:
   establishing a default bearer in response to a request from a wireless device to establish a default bearer;
   establishing an ICN dedicated radio bearer separate from but in parallel with the default bearer, wherein the ICN dedicated radio bearer is terminated locally on the base station and the default bearer is tunneled through the base station towards a core network gateway;
   receiving, from the wireless device, a request for content on the ICN dedicated radio bearer;
   determining if the content in the request is in a cache associated to or in the base station; and
   when the content is cached, sending, to the wireless device, the content;
   when the content is not cached, sending, to an ICN based network, the request on an interface dedicated for ICN communications.

2. The method of claim 1, further comprising:
   receiving an indication that the wireless device is compatible for ICN based communications prior to establishing the ICN dedicated radio bearer.

3. The method of claim 1, further comprising registering, within the base station, the request for content with respect to the wireless device.

4. The method of claim 1, wherein the content is multimedia data.

5. The method of claim 1, wherein the wireless device is a machine-to-machine (M2M) device and the content is M2M related data.

6. The method of claim 1, wherein the interface dedicated for ICN communications is further dedicated for communications to and from the wireless device.

7. The method of claim 1, further comprising:
   receiving, from the ICN based network, a content response; and
   transmitting, to the wireless device, the content response on the ICN dedicated radio bearer.

8. The method of claim 1, further comprising:
   determining a frequency in which the content has been requested; and
   when the frequency is above a predetermined threshold, caching the content within the base station.

9. A base station for Information Centric Networking (ICN) based communications with radio bearers, the base station comprising:
   a receiver configured to receive, from a wireless device, a request to establish a default bearer;
   processing circuitry configured to establish the default bearer with the wireless device and to establish an ICN dedicated radio bearer separate from but in parallel with the default bearer such that the ICN dedicated radio bearer is terminated locally on the base station and the default bearer is tunneled through the base station towards a core network gateway;
   the receiver being further configured to receive, from the wireless device, a request for content on the ICN dedicated radio bearer;
   the processing circuitry being configured to determine if the content in the request is in a cache associated to or in the base station; and
   a transmitter configured to:
      when the content is cached, transmit, to the wireless device, the content, and
      when the content is not cached, transmit, to an ICN based network, the request on an interface dedicated for ICN communications.

10. The base station of claim 9, wherein the receiver is further configured to receive an indication that the wireless device is compatible for ICN based communications, and wherein the processing circuitry is further configured to establish the ICN dedicated bearer in response to the indication.

11. The base station of claim 9, wherein the processing circuitry is further configured to register, within the base station, the request for content with respect to the wireless device.

12. The base station of claim 9, wherein the content is multimedia data.

13. The base station of claim 9, wherein the wireless device is a machine-to-machine (M2M) device and the content is M2M related data.

14. The base station of claim 9, wherein the interface dedicated for ICN communications is further dedicated for communications to and from the wireless device.

15. The base station of claim 9, wherein the receiver is further configured to receive, from the ICN based network, a content response, and wherein the transmitter is further configured to transmit, to the wireless device, the content response on the ICN dedicated radio bearer.

16. The base station of claim 9, wherein the processing circuitry is further configured to determine a frequency in which the content has been requested, and when the frequency is above a predetermined threshold, the processing circuitry is further configured to cache the content within the base station.

17. A method, in a wireless device, for Information Centric Networking (ICN) based communications with radio bearers, the method comprising:
   sending, to a base station, a request for establishment of a default bearer to provide always on connectivity for the wireless device;
   establishing the default bearer with the base station, the default bearer being tunneled through the base station towards a core network gateway;

receiving from the base station a signal to establish an ICN dedicated radio bearer separate from but in parallel with the default bearer;

establishing the ICN dedicated radio bearer with the base station such that the ICN dedicated radio bearer is terminated locally on the base station;

determining, via an Application Programming Interface (API), a need for ICN compatible content; and sending, to a base station, a request for content on the ICN dedicated radio bearer.

18. The method of claim 17, wherein the content is multimedia data.

19. The method of claim 17, wherein the wireless device is a machine-to-machine (M2M) device and the content is M2M related data.

20. The method of claim 17, further comprising receiving, from the base station, a content response on the ICN dedicated radio bearer.

21. A wireless device for Information Centric Networking (ICN) based communications with radio bearers, the wireless device comprising:

a transmitter configured to transmit, to a base station, a request for establishment of a default bearer to provide always on connectivity for the wireless device;

processing circuitry configured to establish the default bearer with the base station, the default bearer being tunneled through the base station towards a core network gateway;

a receiver configured to receive from the base station a signal to establish an ICN dedicated radio bearer separate from but in parallel with the default bearer;

the processor circuitry being further configured to:
 establish the ICN dedicated radio bearer with the base station such that the ICN dedicated radio bearer is terminated locally on the base station; and
 determine, via an Application Programming Interface (API), a need for ICN compatible content; and the transmitter being further configured to transmit, to the base station, a request for content on the ICN dedicated radio bearer.

22. The wireless device of claim 21, wherein the content is multimedia data.

23. The wireless device of claim 21, wherein the wireless device is a machine-to-machine (M2M) device and the content is M2M related data.

24. The wireless device of claim 21, wherein the receiver is further configured to receive, from the base station, a content response on the ICN dedicated radio bearer.

* * * * *

UNITED STATES PATENT AND TRADEMARK OFFICE
CERTIFICATE OF CORRECTION

PATENT NO. : 9,942,831 B2
APPLICATION NO. : 14/431898
DATED : April 10, 2018
INVENTOR(S) : Laraqui et al.

It is certified that error appears in the above-identified patent and that said Letters Patent is hereby corrected as shown below:

In the Specification

In Column 3, Line 62, delete "Home Subscription Service" and insert -- Home Subscriber Server --, therefor.

In Column 4, Line 14, delete "RSL" and insert -- RLS --, therefor.

In Column 4, Line 47, delete "embodiments," and insert -- embodiments; --, therefor.

In Column 4, Line 51, delete "embodiments," and insert -- embodiments; --, therefor.

In Column 6, Lines 47-48, delete "EPS (Evolved Packet Service)" and insert -- EPS (Evolved Packet System) --, therefor.

In Column 7, Line 4, delete "Home Subscription Service)," and insert -- Home Subscriber Server), --, therefor.

In Column 7, Line 60, delete "(Evolved Packet Service)" and insert -- (Evolved Packet System) --, therefor.

In Column 12, Line 32, delete "for th" and insert -- for the --, therefor.

Signed and Sealed this
Twelfth Day of June, 2018

Andrei Iancu
*Director of the United States Patent and Trademark Office*